United States Patent
Karaoguz et al.

(10) Patent No.: US 8,452,847 B2
(45) Date of Patent: May 28, 2013

(54) PROCESSOR SHARING BETWEEN IN-RANGE DEVICES

(75) Inventors: Jeyhan Karaoguz, Irvine, CA (US); James D. Bennett, San Clemente, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1554 days.

(21) Appl. No.: 10/885,406

(22) Filed: Jul. 6, 2004

(65) Prior Publication Data

US 2005/0066229 A1 Mar. 24, 2005

Related U.S. Application Data

(60) Provisional application No. 60/504,869, filed on Sep. 22, 2003.

(51) Int. Cl.
*G06F 15/16* (2006.01)
(52) U.S. Cl.
USPC .......................................................... 709/217
(58) Field of Classification Search
USPC ................................................. 709/217, 205
See application file for complete search history.

(56) References Cited

U.S. PATENT DOCUMENTS

| | | | | |
|---|---|---|---|---|
| 5,319,716 A * | 6/1994 | McGreevy | 381/79 |
| 6,453,419 B1 * | 9/2002 | Flint et al. | 726/3 |
| 7,068,381 B1 * | 6/2006 | Tuli | 358/1.15 |
| 2003/0026432 A1 * | 2/2003 | Woodward | 380/278 |
| 2003/0236890 A1 * | 12/2003 | Hurwitz et al. | 709/227 |
| 2004/0093506 A1 * | 5/2004 | Grawrock et al. | 713/189 |
| 2004/0174822 A1 * | 9/2004 | Bui | 370/252 |
| 2012/0142327 A1 * | 6/2012 | Urbanek | 455/418 |
| 2012/0159472 A1 * | 6/2012 | Hong et al. | 717/178 |

* cited by examiner

*Primary Examiner* — Imad Hussain
(74) *Attorney, Agent, or Firm* — Brinks Hofer Gilson & Lione

(57) ABSTRACT

A system and method for processor sharing between in-range devices. Various aspects of the present invention may comprise establishing a wireless communication link between a first system and a second system, for example, utilizing respective communication modules. A processing capability of the second system that is available for use with the first system may be identified, for example, by respective processing capability identification modules. An indication of the identified processing capability may be output, for example, by respective output modules of at least one of the first and second systems. A request for utilizing the identified processing capability of the second system with the first system may be received, for example, by respective interface modules of at least one of the first and second systems. The requested processing capability of the second system may be utilized with the first system, for example, by respective processing modules of the systems.

49 Claims, 6 Drawing Sheets

PROCESSOR SHARING BETWEEN IN-RANGE DEVICES

CROSS-REFERENCE TO RELATED APPLICATIONS/INCORPORATION BY REFERENCE

This patent application is related to and claims priority from provisional patent application Ser. No. 60/504,869 filed Sep. 22, 2003, and titled "PROCESSOR SHARING BETWEEN IN-RANGE DEVICES," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Modern communication networks include an ever-widening array of systems and devices. In addition to traditional types of computer systems, communication networks now include a large variety of mobile devices. For example, modern communication networks may include, without limitation, pagers, cell phones, laptop computers, personal digital assistants, notepad computers, etc. Further, modern communication networks may include devices and systems that were traditionally stand-alone systems. For example, modern communication networks may include video and audio recording and playback systems, security systems, telephones, home appliances, automobiles, etc.

Certain networked systems may include a large variety of processing applications. For example, and without limitation, certain networked systems may include word processing applications, spreadsheet applications, multimedia applications, communication applications, audio and video processing applications, graphics applications, digital signal processing applications, data processing applications, user interface applications, etc. Such systems may, for example, include amounts of processing power large enough to perform numerous processing tasks simultaneously. Such systems may, for example, be communicatively coupled to relatively large amounts of memory. Such systems may, for example, have access to relatively unlimited amounts of electrical energy. Such systems may, for example, be communicatively coupled to various local and wide area communication networks, including the Internet.

On the other hand, certain other systems may include a relatively limited number of processing applications. The reasons for this may include any of a number of reasons, including but not limited to, limited processing power, limited memory, limited I/O capability, limited energy supply, etc. Such processing applications may also be reduced versions of related complete applications that do not include all of the functionality of the related complete applications. For example, a portable computing device may include a reduced version of a word processing package designed for more powerful systems. Such systems may, for example, include relatively limited processing capability. Such systems may, for example, include relatively limited memory and communication capabilities. Such systems may further, for example, include relatively limited user interface capabilities.

Thus, modern communication networks often include a dynamic group of systems and devices with largely disparate processing capabilities.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

Various aspects of the present invention provide a system and method for processor sharing between in-range devices. A first system and a second system may establish a wireless communication link between them. The first and second systems may, for example, utilize respective communication modules to establish such a communication link.

Various aspects of the present invention may identify a processing capability of the second system that is available for use with the first system. The first and/or second systems may, for example, utilize respective processing capability identification modules to make such a determination. Such processing capability identification may comprise, for example, communicating information of available computer applications, security information, user interface capability, data resources and communication capabilities. Processing capability may then be determined using any or all of the aforementioned information or other information not listed.

Various aspects of the present invention may output an indication of the identified processing capability. The first and/or second systems may, for example, utilize respective output modules to output such an indication. Such an indication may, for example, be a human-perceivable indication or a user-selectable indication. Such an indication may alternatively, for example, be an electrical signal.

Various aspects of the present invention may receive a request for utilizing the identified processing capability of the second system with the first system. The first and/or second systems may, for example, utilize respective interface modules to receive such a request. Such a request may, for example, be received from a user of at least one of the first and second systems. Such a request may, for example, be received from a module configured to generate the request.

Various aspects of the present invention may utilize the requested processing capability of the second system with the first system. The first and/or second systems may, for example, utilize respective processing modules to utilize the requested processing capability of the second system with the first system. A processing module of the first system may, for example, communicate information to the processing module of the second system for processing. A processing module of the second system may, for example, perform the requested processing capability under the direction of the processing module of the first system.

These and other advantages, aspects and novel features of the present invention, as well as details of illustrative aspects thereof, will be more fully understood from the following description and drawings.

DETAILED DESCRIPTION OF THE INVENTION

Figure 1:
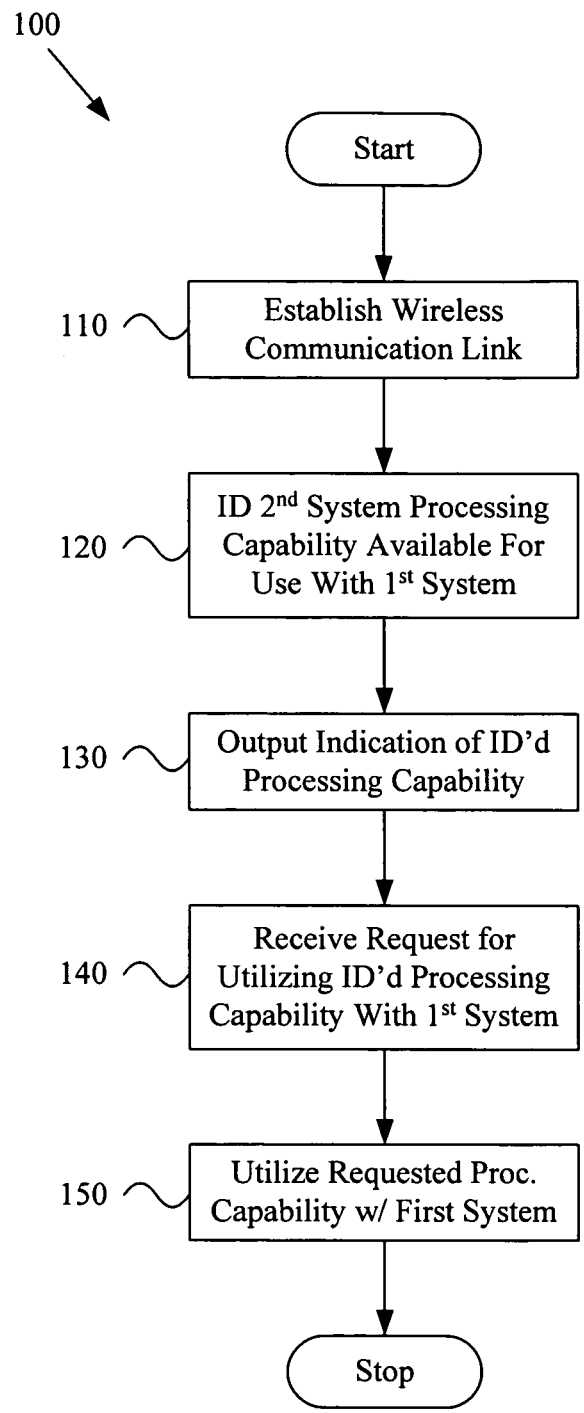
FIG. 1 is a flow diagram illustrating a method for sharing processing resources between in-range devices, in accordance with various aspects of the present invention.

FIG. 1 is a flow diagram illustrating a method 100 for sharing processing resources between in-range devices, in accordance with various aspects of the present invention. The method 100, at step 110, comprises establishing a wireless communication link between a first system and a second system. In an exemplary scenario, step 110 may comprise the first system advertising its presence to other systems in a wireless communication network. One of such systems may be the second system, which may then respond to the first system by communicating with the first system to establish a wireless communication link between the first system and the second system.

Step 110 generally comprises establishing a wireless communication link between the first and second systems, and does not require following a particular standard or proprietary wireless communication protocol. For example and without limitation, the first and second systems may communicate using IEEE 802.11, 802.15, UWB, Bluetooth, Zigbee, or any of a large variety of communication protocols. Nor does step 110 require the wireless communication link to utilize a particular communication medium. For example and without limitation, the communication medium may comprise radio frequency communication or optical communication. Accordingly, the scope of various aspects of the present invention should not be limited by characteristics of a particular communication standard, protocol or medium.

Figure 2:
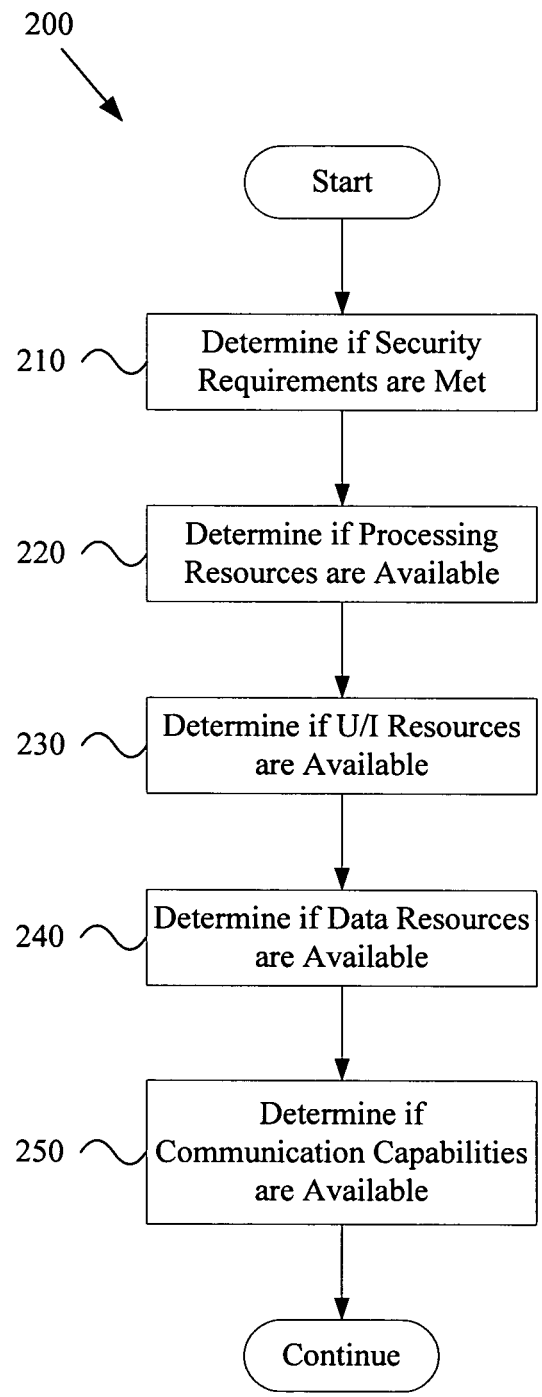
FIG. 2 is a flow diagram illustrating an exemplary method for identifying processing capability on a second system that is available for use with a first system, in accordance with various aspects of the present invention.

The method 100, at step 120, comprises identifying a processing capability of the second system that is available for use with the first system. For example, step 120 may include identifying a particular computer application or general data processing capability that the second system has available for use with the first system. The method 200 illustrated in FIG. 2 shows various exemplary aspects that step 120 may comprise. The following discussion will temporarily focus on FIG. 2.

FIG. 2 is a flow diagram illustrating a method 200 for identifying system processing capability on a second system that is available for use with a first system, in accordance with various aspects of the present invention. Various aspects of the method 200 may, for example, be utilized in implementing step 120 of the method 100 illustrated in FIG. 1. Note, however, that the various aspects of the method 200 are illustrative and accordingly are not intended to represent an exhaustive list of steps, nor are they intended to represent a list of steps that must be taken. For example, step 120 of the method 100 illustrated in FIG. 1 may perform a portion of the method 200 steps, none of the method 200 steps, all of the method 200 steps, and/or steps not indicated by the method 200.

The method 200, at step 210, comprises determining if various security requirements are met for various processing capabilities of the second system to be utilized with the first system. For example, the first system may have security concerns that must be met by the second system, prior to utilizing a processing capability of the second system with the first system. For example and without limitation, the first system may require that the second system have at least a particular level of encryption/decryption capability, the first system may require that the second system not place information from the first system in non-volatile memory, the first system may require that the second system purge all information related to the first system after use, the first system may require that the second system lock out all other users (or users below a predetermined security level threshold) while the processing capability of the second system is being utilized with the first system. The previous list is illustrative and by no means to be taken as exhaustive.

Also, for example, the second system may have various security requirements that must be met by the first system, or a user thereof, prior to utilization of a processing capability of the second system with the first system. For example and without limitation, the second system may require the first system, or user thereof, to be a member of a registered group to share processing capabilities. Additionally, for example, the second system may require the first system to have a predetermined level of secure communication capability.

Note also that security concerns of the first and second systems may be associated with the entire systems, or may be associated with particular processing capabilities. For example, the second system may allow the utilization of audio and video entertainment processing capabilities with any first system and user, allow the utilization of email and word processing capabilities with a first system, or user thereof, with a low security level, and only allow the utilization of processing that requires access to sensitive data or communication capabilities with a first system and/or user with a high security level.

Generally, step 210 comprises the first and/or second systems determining if various security requirements are met. Step 210 may or may not, for example, be performed at step 120 of the method 100 illustrated in FIG. 1. Accordingly, the scope of various aspects of the present invention should not be limited by characteristics of particular security requirements or the processing thereof.

The method 200, at step 220, comprises determining if processing resources of the second system are available for use with the first system. For example, various processing resources of the second system may not be compatible for use with the first system. For example and without limitation, the second system may be capable of utilizing a word processing application with the first system, but may not be capable of utilizing a spreadsheet application with the first system. Also for example, the second system may be capable of using an audio information processing application with the first system, but may not be capable of using a video information processing application with the first system. The previous examples are by no means exhaustive, and are merely presented to illustrate that not all of the processing capabilities of the second system may be capable of being utilized with the first system.

Additionally, for example, there may be use limits on processing capabilities of the second system. For example, if a user of the second system is currently utilizing email application processing capability of the second system, such processing capability may not be available for use with the first system. Also, for example, the second system may be utilizing a multi-media information processing application with a third system and may not have the multi-process capability or licensing permission to also utilize the application concurrently with the first system.

Step 220 may also comprise, for example, communicating processing capabilities of the first system to the second system. For example, to utilize various processing capabilities of the second system with the first system, the various processing capabilities may require the first system to have compatible processing capabilities. For example and without limitation, the second system may have a full-capability version of a particular computer application that may not be utilized with the first system unless the first system has at least a reduced-capability version of the particular computer application. In such an exemplary scenario, the first and second system may determine that a particular processing capability of the second system is not available for use with the first system, because the first system does not have the required compatible computer application.

Also, for example, the second system may require the first system to execute instructions (e.g., Java applets) or interpret data sent from the second system to the first system. In such an exemplary scenario, the first and second system may determine that the particular processing capability of the second system is available for use with the first system, because the first system has a compatible command or data interpreter. In such an exemplary scenario, the first and second systems may also communicate to remedy an identified deficiency. For example, the second system may communicate with the first system to download a necessary application or interpreter to the first system so that the particular processing capability of the second system will be available for use with the first system.

In general, step 220 comprises determining if one or more processing capabilities of the second system are available for use with the first system. As discussed above, such a determination may include various availability and compatibility determinations. Accordingly, the scope of various aspects of the present invention should by no means be limited by characteristics of particular availability and compatibility determinations.

The method 200, at step 230, comprises determining if any potentially necessary or desirable user interface resources are available. In determining whether a particular processing capability of the second system is available for use with the first system, such a determination may hinge on the availability of particular user interface resources at the first and/or second system.

By way of example, consider a scenario in which the second system has an advanced video processing application that the second system may utilize with the first system. However, another user or system may be utilizing the high-resolution display of the second system and the first system may not have such a display available either. In such a situation, even though the second system may have the capability to utilize the video processing application to process information with the first system, the second system and first system may not have the necessary user interface resources available to support such use.

In another example, the second system may have the capability to execute a word processing application for use with data from the first system. The first and/or second system may determine that there is not currently an available keyboard resource to utilize with the word processing application, and therefore determine that the word processing application is not available for use with the first system.

In general, step 230 comprises determining if required or desirable user interface resources are available to support utilizing a particular processing capability of the second system with the first system. The previous examples are merely illustrative. Accordingly, the scope of various aspects of the present invention should not be limited by characteristics of particular U/I resource usage scenarios, U/I resources, or computer applications.

The method 200, at step 240, comprises determining if necessary or desirable data resources are available for utilizing one or more particular processing capabilities of the second system with the first system. In various processing scenarios, it may be desirable or necessary for the second system and/or first system to have access to particular data resources for the effective utilization of a processing capability. For example, in an exemplary scenario where the particular processing capability requires access to a database, and the second system does not presently have access to such a database, the first and/or second system may determine that the particular processing capability is not available for use with the first system.

For example, consider an exemplary scenario where the processing capability of the second system being considered for availability for use with the first system is a word processing application that the first system user wants to utilize to view an email attachment stored at a networked email server. The first system may know the location of the email attachment, but unless the second and/or first system can provide the word processing application with the email attachment data, the word processing application may effectively not be available for use with the first system for the desired task.

In another example, consider an exemplary scenario where the processing capability of the second system being considered for availability for use with the first system is a database search engine that the first system user wants to utilize to find a particular data record stored at a networked database. The networked database may include various types of information (e.g., personal information, audio/video information, financial information, etc.) If the second system is not communicatively coupled to the desired networked database, the database search engine may effectively be not available for use with the first system.

In general, step 240 comprises determining if necessary or desirable data resources are available for utilizing one or more particular processing capabilities of the second system with the first system. The previous examples are merely illustrative. Accordingly, the scope of various aspects of the present invention should not be limited by characteristics of particular data use scenarios, data types, data resources, data links, or data processing applications.

The method 200, at step 250, comprises determining if necessary or desirable communication capabilities are available. For example, utilizing particular processing capabilities of the second system with the first system may require particular communication capabilities on the part of the first and/or second systems to be effective. For example and without limitation, utilization of a video processing application on the second system to process video information from the first system at a desired rate may require a communication link between the first and second systems to exceed a threshold data transfer rate. In such an exemplary scenario, if the first and second systems may only communicate with each other over a communication link with relatively low data rate, the first and/or second system may determine that the video processing application is effectively not available for use with the first system.

The communication capability determination of step 250 is not restricted to communication capability between the first and second system. For example, the processing capability of the second system that is being considered for use with the first system may be a web browser or Internet audio streaming application. In such an exemplary scenario, it may be of importance to the availability determination whether the second system is currently communicatively coupled to the Internet. In such an exemplary scenario, if the second system is not communicatively coupled to the Internet, the first and/or second system may determine that the web browser or Internet audio streaming applications are effectively not available for use with the first system.

In general, step 250 comprises determining if necessary or desirable communication capabilities are available for effective utilization of one or more particular processing capabilities of the second system with the first system. The previous examples are merely illustrative. Accordingly, the scope of various aspects of the present invention should not be limited by characteristics of particular communication scenarios, communication links or processing that utilizes such communication links.

FIG. 2 illustrates an exemplary method 200 for identifying processing capability of a second system that is available for use with a first system. As mentioned previously, various aspects of the method 200 may, for example, be utilized in implementing step 120 of the method 100 illustrated in FIG. 1. The various aspects of the method 200 discussed above are illustrative and accordingly are not intended to represent an exhaustive list of steps, nor are they intended to represent a list of steps that must be taken. Accordingly, the scope of various aspects of the present invention should not be limited by characteristics of particular aspects of the method 200 discussed above.

Returning to the discussion of the method 100 illustrated in FIG. 1, the method, at step 130, comprises outputting an indication of identified processing capability of the second system that is available for use with the first system. The following discussion will generally address a single identified processing capability, but there may, of course, be a plurality of identified processing capabilities.

Step 130 may comprise, for example, one of the first and second systems communicating a signal to the other system that indicates the identified processing capability. For example, in a scenario where the second system identifies the processing capability of the second system that is available for use with the first system, the second system may communicate information of the identified processing capability to the first system. Alternatively, in a scenario where the first system identifies the processing capability of the second system that is available for use with the first system, the first system may communicate information of the identified processing capability to the second system. Such communication between the first and second systems may, for example, utilize any of a variety of communication signal types.

Alternatively, for example, the second system may communicate information of the identified processing capability to a user in human-perceivable form. For example, the second system may generate a graphical indication of the identified processing capability on a display coupled to the second system. A user near the display may then view the display and know that the processing capability of the second system has been identified as being available for use with the first system.

Alternatively, for example, where the first system identifies the processing capability of the second system that is available for use with the first system (e.g., by making the determination itself or by receiving a signal from the second signal identifying the processing capability), the first system may communicate information of the identified processing capability to a user in human-perceivable form. For example, the first system may present a graphical indication of the identified processing capability on a display coupled to the first system. A user near the display may then view the display and know that the processing capability of the second system has been identified as being available for use with the first system.

In a scenario where at least one of the first and second systems presents a human-perceivable indication to a user that indicates an identified processing capability of the second system that is available for use with the first system, the first and/or second system may provide the user with the ability to select the indication. For example, the first and/or second system may provide a user interface allowing a user to select such a graphical indication using a mouse, touch pad, thumbwheel, or touch screen.

In general, step 130 comprises outputting an indication of a processing capability of the second system that has been identified as being available for use with the first system. The previous examples are merely illustrative. Accordingly, the scope of various aspects of the present invention should not be limited by characteristics of particular indications, human-perceivable or not, or methods of providing such indications.

The method 100, at step 140, comprises receiving a request for utilizing the identified processing capability of the second system with the first system. Such a request may, for example, originate from a user utilizing user interface resources coupled to the first system, second system or a third system that is communicatively coupled to the first or second system. For example, as discussed previously, the first or second system may generate a human-perceivable indication of an identified processing capability, and such human-perceivable indication may also be user-selectable. In such an exemplary scenario, a user may select the indication (graphical or otherwise), which in turn results in the user interface generating a signal indicative of the signal selection.

The first and second systems may communicate information of such a user selection with each other. For example, if a user of the first system requests utilization of a particular processing capability of the second system with the first system, the first system may communicate information of the user's request to the second system. Alternatively, if a user makes such a request at the second system, the second system may communicate information of the user's request to the first system.

In another exemplary scenario, a user may have preconfigured the user's system to automatically generate such a request. For example, a user of the first system may have configured the first system to automatically generate a request for a particular type of identified processing capability upon a determination that such processing capability is available. In such a scenario, aspects of at least one of the first and second systems may receive a request for utilizing a particular processing capability of the second system with the first system, where the request was automatically generated by a module of the first or second system.

In general, step 140 comprises receiving a request for utilizing the identified processing capability of the second system with the first system. The previous examples are merely illustrative. Accordingly, the scope of various aspects of the present invention should not be limited by characteristics of particular requests, request types, request sources or request recipients.

Figure 3:
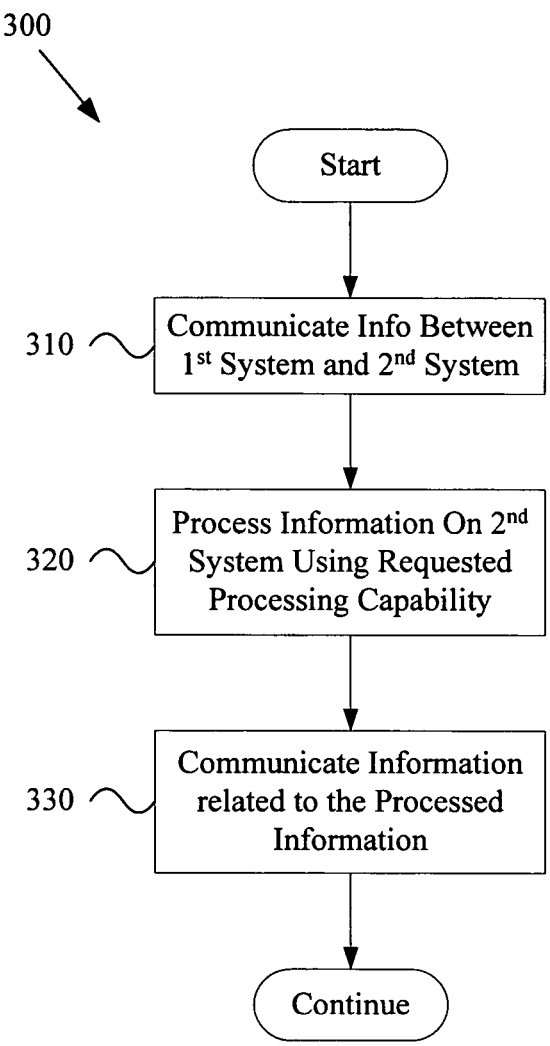
FIG. 3 is a diagram illustrating an exemplary method for utilizing processing capability of a second system with a first system, in accordance with various aspects of the present invention.

The method 100, at step 150, comprises utilizing the requested processing capability of the second system with the first system. FIG. 3 is a diagram illustrating an exemplary method 300 for utilizing processing capability of a second system with a first system, in accordance with various aspects of the present invention. Various aspects of the method 300 may, for example, be utilized in implementing step 150 of the method 100 illustrated in FIG. 1. Note, however, that the various aspects of the method 300 are illustrative and accordingly are not intended to represent an exhaustive list of steps, nor are they intended to represent a list of steps that must be taken. For example, step 150 of the method 100 illustrated in FIG. 1 may perform a portion of the method 300 steps, none of the method 300 steps, all of the method 300 steps, and/or steps not indicated by the method 300.

The method 300, at step 310, comprises communicating information between the first and second systems. Such communication may comprise, for example, communicating data from the first system to the second system that is to be processed by the requested processing capability of the second system. For example, the data may comprise word processing data, numerical processing data, audio and video data, etc.

Such communication may comprise, for example, communicating information from the first system to the second system that is indicative of the location of data to be processed by the requested processing capability of the second system. For example, the first system may communicate data location information (e.g., pointer or Uniform Resource Locator (URL) information) to the second system, which the second system may then use to obtain data to process by the requested processing capability of the second system. For example, in a scenario where the first system communicates URL information to the second system, the second system may use a web browser to obtain the data to be processed.

Such communication may comprise, for example, communicating information between the first and second systems that is used to control the processing capability of the second system. For example, the first system may communicate information to the second system that triggers or halts execution of the requested processing capability on the second system. Also, for example, the first and second systems may communicate information of the status of the requested processing capability executing on the second system.

In general, step 310 comprises communicating information between the first and second systems, where such information generally concerns the processing of information by the requested processing capability of the second system. Such information may, for example, comprise data information, data location information, communication information, control information, etc. Accordingly, the scope of various aspects of the present invention should not be limited by characteristics of particular communicated information or particular methods of communicating or processing such information.

The method 300, at step 320, comprises processing the data on the second system using the requested processing capability of the second system. For example, the second system may process textual information utilizing a requested word processing capability, graphical information utilizing a requested graphics processing capability, audio information utilizing a requested audio processing capability, video information utilizing a requested video processing capability, numerical information utilizing a requested spreadsheet processing capability, email information utilizing a requested email processing capability, etc. The previous list of processing capabilities is merely exemplary and by no means exhaustive. Accordingly, the scope of various aspects of the present invention should not be limited by characteristics of particular shared processing capabilities of the second system.

The method 300, at step 330, comprises communicating information resulting from performing the requested processing capability on the second system. For example, the second system may communicate information resulting from the requested processing capability directly to a user in human-perceivable form (e.g., by outputting indications of the processed information on a video or audio output device). Alternatively, for example, the second system may communicate information resulting from the requested processing capability to the first system. The first system may then, for example, communicate at least a portion of such information to the user in a human-perceivable form (e.g., by outputting an indication of the processed information on a video or audio output device). Alternatively, in an exemplary scenario where the second system performs the requested processing capability on networked database information, the second system may communicate information resulting from performing the requested processing capability to the networked database for storage.

In general, step 330 comprises communicating information resulting from the requested processing capability. The previous examples are merely illustrative. Such communication may occur from a variety of sources, over a variety of media, to a variety of destinations. Accordingly, the scope of various aspects of the present invention should not be limited by characteristics of particular communication types, protocols, sources, destinations, etc.

Figure 4:
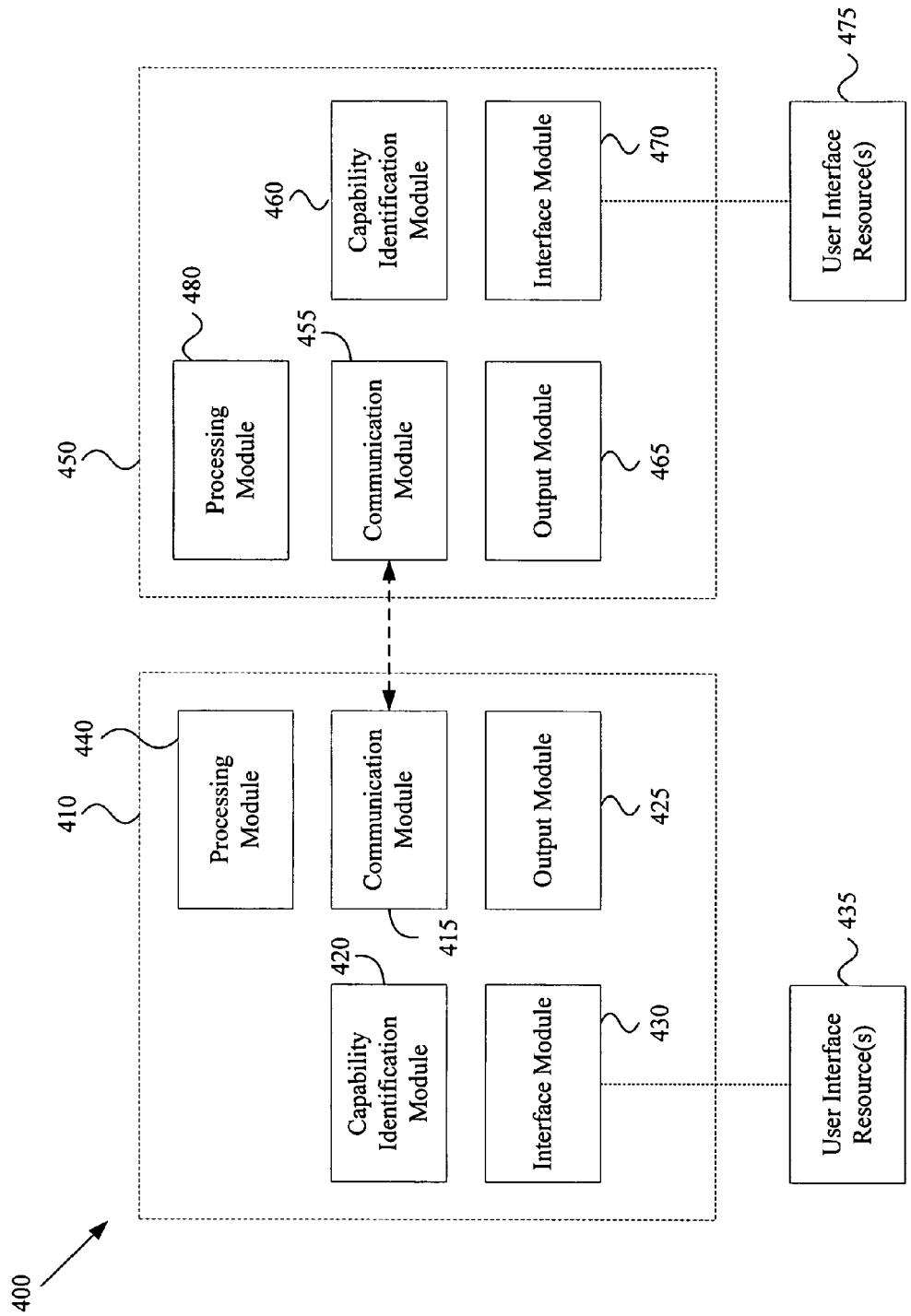
FIG. 4 is a diagram showing a system for sharing processing resources between in-range devices, in accordance with various aspects of the present invention.

FIG. 4 is a diagram showing a system 400 for sharing processing resources between in-range devices, in accordance with various aspects of the present invention. The system 400 and various components of the system 400 may, for example, implement various aspects of the present invention as discussed previously with regard to the methods 100, 200 and 300 illustrated in FIGS. 1-3. Note, however, that the structure and operation of the various components of the system 400 should not be limited to structure performing the various aspects of the present invention as discussed previously with regard to the methods 100, 200 and 300 illustrated in FIGS. 1-3.

The exemplary system 400 may include a first system 410 and a second system 450. The first system 410 may, for example, comprise a communication module 415, a processing capability identification module 420, an output module 425, an interface module 430, various user interface resources 435 and a processing module 440. The second system 450 may, for example, comprise a communication module 455, a processing capability identification module 460, an output module 465, an interface module 470, various user interface resources 475 and a processing module 480.

The first system 410 may comprise a communication module 415, and the second system 450 may comprise a communication module 455. The respective communication modules 415, 455 may establish a wireless communication link between the first system 410 and the second system 450. In an exemplary scenario, the communication module 415 of the first system 410 may advertise its presence to other systems in a wireless communication network. One of such systems may, for example, be the second system 450, which may utilize its communication module 455 to communicate with the communication module 415 of the first system 410 and establish a wireless communication link between the first system 410 and the second system 450.

The respective communication modules 415, 455 of the first system 410 and second system 450 may establish any of a variety of types of communication links between the first system 410 and the second system 450. For example and without limitation, the respective communication modules 415, 455 may communicate using various proprietary and standard communication protocols, such as IEEE 802.11, 802.15, UWB, Bluetooth, Zigbee, or any of a large variety of communication protocols. The respective communication modules 415, 455 may establish a wireless communication link over various media, for example, radio frequency and optical media.

In general, the respective communication modules 415, 455 may establish a wireless communication link between their respective systems 410, 450. Accordingly, the scope of various aspects of the present invention should not be limited by characteristics of, or apparatus related to, a particular communication standard, protocol or medium.

The first system 410 may comprise a processing capability identification module 420 that is communicatively coupled to the communication module 415. The processing capability identification module 420 may, for example, identify a processing capability of the second system 450 that is available for use with the first system 410. Such processing capability may, for example, comprise a particular computer application or general information processing capability that the second system has available for use with the first system.

By way of example, the processing capability identification module 420 may communicate with the second system 450 (e.g., a corresponding processing capability identification module 460 of the second system 450) to identify one or more processing capabilities of the second system 450 that are available for use with the first system 410. The processing capability identification module 420 of the first system 410 and/or the processing capability identification module 460 of the second system 450 may, for example, perform various aspects of the method step 120 and method 200 illustrated in FIGS. 1-2 and discussed previously.

For example and without limitation, one or both of the processing capability identification modules 420, 460 may determine if various security requirements are met for utilizing various processing capabilities of the second system 450 with the first system 410. For example, the first system 410, or a user thereof, may have security concerns that must be met by the second system 450 prior to utilizing a processing capability of the second system 450 with the first system 410. For example and without limitation, the first system 410 may require that the second system 450 have at least a particular level of encryption/decryption capability, the first system 410 may require that the second system 450 will not place information from the first system 410 in non-volatile memory, the first system 410 may require that the second system 450 purge all information related to the first system 410 after use, the first system 410 may require that the second system 450 lock out all other users (or users below a predetermined security level threshold) while the processing capability of the second system 450 is being utilized with the first system 410. The previous list of security concerns is by no means exhaustive.

Also, for example, the second system 450 may have various security requirements that must be met by the first system 410, or a user thereof, prior to utilization of a processing capability of the second system 450 with the first system 410. For example and without limitation, the second system 450 may require the first system 410, or user thereof, to be a member of a registered group to share processing capabilities. Additionally, for example, the second system 450 may require the first system 410 to have a predetermined level of secure communication capability.

Note also that security concerns of the first system 410 and second system 450 may, for example, be associated with the entire systems, or may be associated with particular processing capabilities within each system. For example, the second system 450 may allow the utilization of audio and video entertainment processing capabilities with any first system 410 and user, allow the utilization of email and word processing capabilities with a first system 410, or user thereof, at a relatively low security level, and only allow the utilization of processing that requires access to sensitive data or communication capabilities with a first system 410 and/or user at a relatively high security level.

Generally, a respective processing capability identification module 420, 460 of the first 410 and/or second 450 system may determine if various security requirements are met. Accordingly, the scope of various aspects of the present invention should not be limited by characteristics of particular security requirements or related apparatus.

One or both of the processing capability identification modules 420, 460 may, for example, determine if various processing resources of the second system 450 are available for use with the first system 410, and whether the first 410 and second 450 systems have the capability to use various processing resources of the second system 450 with the first system 410.

For example, various processing resources of the second system 450 may not be compatible with the first system 410. For example and without limitation, the second system 450 may be capable of utilizing a particular word processing application with the first system 410, but may not be capable of utilizing a particular spreadsheet application with the first system 410. Also for example, the second system 450 may be capable of using an audio information processing application with the first system 410, but may not be capable of using a video information processing application with the first system 410. The previous examples are by no means exhaustive, and are merely presented to illustrate that the first 410 and second 450 systems may not be capable of utilizing all of the processing capabilities of the second system 450 with the first system 410.

Additionally, for example, there may be use limits on processing capabilities of the second system 450. For example, if a user of the second system 450 is currently utilizing email application processing capability of the second system 450, such processing capability may not be currently available for use with the first system 410. Also, for example, the second system 450 may be utilizing a multi-media information processing application with a third system and may not have the multi-process capability or licensing permission to also utilize the application with the first system 410.

The respective processing capability identification modules 420, 460 may also, for example, utilize respective communication modules 415, 455 to communicate processing capabilities between the first system 410 and the second system 450. For example, to utilize various processing capabilities of the second system 450 with the first system 410, the various processing capabilities may require the first system 410 to have compatible processing capabilities. For example and without limitation, the second system 450 may have a full-capability version of a particular computer application that may not be utilized with the first system 410 unless the first system 410 has at least a reduced-capability version of the particular computer application. In such an exemplary scenario, if the first system 410 does not have the required compatible computer application, then one or both of the processing capability identification modules 420, 460 may determine that the particular processing capability of the second system 450 is not available for use with the first system 410.

Also, for example, to utilize a processing capability of the second system 450 with the first system 510, the second system 450 may require the first system 410 to be capable of executing instructions (e.g., Java applets) or interpret a particular type of data sent from the second system 450 to the first system 410. In such an exemplary scenario, if the first system 410 has a compatible command or data interpreter, then one or both of the processing capability identification modules 420, 460 may determine that the particular processing capability of the second system 450 is available for use with the first system 410.

In another exemplary scenario, the first 410 and second 450 systems may also communicate to remedy an identified deficiency. For example, if at least one of the processing capability identification modules 420, 460 determine that the first system 410 does not have the required command or data interpreter or other required support application, the second system 450 may communicate with the first system 410 to download a necessary application or interpreter to the first system 410 so that the particular processing capability of the second system 450 will be available for use with the first system 410.

Generally, the respective processing capability identification modules 420, 460 of the first 410 and/or second 450 systems may determine whether the first 410 and second systems 450 have the capability to utilize various processing capabilities of the second system 450 with the first system 410. Accordingly, the scope of various aspects of the present invention should not be limited by characteristics of particular processing capabilities, resources, computer applications or related apparatus.

One or both of the respective processing capability identification modules 420, 460 may, for example, determine if user interface resources that are necessary or desirable for utilizing a processing capability of the second system 450 with the first system 410 are available. Such a determination may, for example, hinge on the availability of one or more particular user interface resources at the first system 410 or the second system 450.

By way of example, consider a scenario in which the second system 450 has an advanced video processing application that the second system 450 may utilize with the first system 410. However, another user or system may be utilizing the high-resolution display of the second system 450, and the first system 410 may not have such a display available either. In such a situation, even though the second system 450 and first system 410 may otherwise have the capability to utilize the video processing application to process information with the first system 410, the first 410 and second 450 systems may not have the necessary or desired user interface resources available to support such use. Accordingly, one or both of the respective processing capability identification modules 420, 460 of the first 410 and second 450 systems may determine that the video processing application of the second system 450 is currently not available for use with the first system 410.

In another example, the second system 450 may otherwise have the capability to execute a word processing application for use with data from the first system 410, but there is not currently an available keyboard resource to utilize with the word processing application. Accordingly, one or both of the respective processing capability identification modules 420, 460 of the first 410 and second 450 systems may determine that the word processing application of the second system 450 is not available for use with the first system 410.

Generally, the respective processing capability identification modules 420, 460 of the first 410 and/or second 450 systems may determine whether the first 410 and second systems 450 have user interface resources that are necessary or desirable for utilizing a processing capability of the second system 450 with the first system 410. Accordingly, the scope of various aspects of the present invention should not be limited by characteristics of particular processing capabilities, user interface resources or related apparatus.

One or both of the respective processing capability identification modules 420, 460 may determine if data or other information resources that are necessary or desirable for utilizing a processing capability of the second system 450 with the first system 410 are available. For example, at least one of the respective processing capability identification modules 420, 460 of the first 410 and second 450 systems may determine if particular data or information sources are necessary for the utilization of a processing capability of the second system 450 with the first system 410. At least one of the respective processing capability identification modules 420, 460 of the first 410 and second 450 systems may then determine whether the first 410 and/or second 450 systems have access to such data or information resources.

In various processing scenarios, it may be desirable or necessary for the second system 450 and/or first system 410 to have access to particular data resources for the effective utilization of a processing capability of the second system 450 with the first system 410. For example, in an exemplary scenario where the particular processing capability requires access to a particular database, and the second system 450 and/or first system 410 does not presently have access to the particular database, at least one of the respective processing capability identification modules 420, 460 of the first 410 and/or second 450 systems may determine that the particular processing capability of the second system 450 is not available for use with the first system 410.

Also for example, consider an exemplary scenario where the processing capability of the second system 450 being considered for availability for use with the first system 410 is a word processing application that the first system 410 user wants to utilize to view an email attachment stored at a networked email server. The first system 410 may know the location of the email attachment, but unless the second 450 and/or first 410 systems can provide the word processing application with the email attachment data, the word processing application of the second system 450 may be effectively unavailable for use with the first system 410.

In another example, consider an exemplary scenario where the processing capability of the second system 450 being considered for availability for use with the first system 410 is a database search engine that the first system 410 user wants to utilize to find a particular data record stored at a networked database. The networked database may include various types of information (e.g., personal information, audio/video information, financial information, etc.). If the second system 450 is not communicatively coupled to the desired networked database, then at least one of the respective processing capability identification modules 420, 460 of the first 410 and second 450 systems may determine that the database search engine is not available for use with the first system 410.

Generally, the respective processing capability identification modules 420, 460 of the first 410 and/or second 450 systems may determine whether the first 410 and/or second systems 450 have access to data or information resources that are necessary or desirable for utilizing a processing capability of the second system 450 with the first system 410. Accordingly, the scope of various aspects of the present invention should not be limited by characteristics of particular data or information resources, links thereto, associated computer applications or related apparatus.

One or both of the respective processing capability identification modules 420, 460 may, for example, determine if one or both of the first 410 and second 450 systems have communication capabilities that are necessary or desirable for utilizing a processing capability of the second system 450 with the first system 410. For example, utilizing particular processing capabilities of the second system 450 with the first system 410 may require particular communication capabilities on the part of the first 410 and/or second 450 systems.

For example and without limitation, utilization of a video processing application on the second system 450 to process video information from the first system 410 at a desired rate may require a communication link between the first 410 and second 450 systems to exceed a threshold data transfer rate. In such an exemplary scenario, if the first 410 and second 450 systems may only communicate with each other over a communication link with a relatively low data rate, one or both of the respective processing capability identification modules 420, 460 of the first 410 and second 450 systems may determine that the video processing application of the second system 450 is not available for use with the first system 410.

Note that the communication capability determination is not restricted to communication capability between the first 410 and second 450 systems. For example, consider the exemplary scenario where the processing capability of the second system 450 that is being considered for use with the first system 410 is a web browser or Internet audio streaming application. In such an exemplary scenario, it may be of importance to the availability determination whether the second system 450 is currently communicatively coupled to the Internet. In such an exemplary scenario, if the second system 450 is not communicatively coupled to the Internet, one or both of the respective processing capability identification modules 420, 460 may determine that the web browser or Internet audio streaming applications of the second system 450 are not available for use with the first system 410.

In general, one or both of the respective processing capability identification modules 420, 460 may determine if one or both of the first 410 and second 450 systems have communication capabilities that are necessary or desirable for utilizing a processing capability of the second system 450 with the first system 410. Accordingly, the scope of various aspects of the present invention should not be limited by characteristics of a particular communication capability, link, protocol, computer application or related apparatus.

The previous examples presented for the respective processing capability identification modules 420, 460 of the first 410 and second 450 systems are merely illustrative. The exemplary illustrations are in no way intended to be an exhaustive list of capabilities of the respective processing capability identification modules 420, 460.

The first and second systems 410 may, for example, include respective output modules 425, 465. The respective output modules 425, 465 may, for example, output an indication of processing capability of the second system 450 that has been identified as available for use with the first system 410. The following discussion will generally address a single identified processing capability, but there may, of course, be a plurality of identified processing capabilities.

The respective output modules 425, 465 may, for example, utilize respective communication modules 415, 455 of the first 410 and second 450 systems to communicate a signal indicative of the identified processing capability. For example, in a scenario where the second system 450 processing capability identification module 460 identifies the processing capability of the second system 450 that is available for use with the first system 410, the processing capability identification module 460 may utilize the communication module 455 of the second system 450 to communicate information of the identified processing capability to the communication module 415 of the first system 410. Alternatively, in a scenario where the first system 410 processing capability identification module 420 identifies the processing capability of the second system 450 that is available for use with the first system 410, the processing capability identification module 420 may utilize the communication module 415 of the first system 410 to communicate information of the identified processing capability to the second system 450. Such communication between the first 410 and second 450 systems may, for example, utilize any of a variety of communication signal types.

Alternatively, for example, the processing capability identification module 460 of the second system 450 may utilize the output module 465 of the second system 450 to communicate information of the identified processing capability to a user in human-perceivable form. For example, the output module 465 of the second system 450 may generate a graphical indication of the identified processing capability on a display coupled to the output module 465. A user near the display may then view the display and know that the processing capability of the second system 450 has been identified as being available for use with the first system 410.

Alternatively, for example, the processing capability identification module 460 of the first system 410 may utilize the output module 425 of the first system 410 to communicate information of the identified processing capability to a user in human-perceivable form. For example, the output module 425 of the first system 410 may generate a graphical indication of the identified processing capability on a display coupled to the output module 425. A user near the display may then view the display and know that the processing capability of the second system 450 has been identified as being available for use with the first system 410.

In a scenario where at least one of the respective output modules 425, 465 generates a human-perceivable indication to a user that indicates an identified processing capability of the second system 450 that is available for use with the first system 410, the first 410 and/or second 450 systems may provide the user with the ability to select the indication. For example, one or both of the first 410 and/or second systems 450 may comprise a respective interface module 430, 470 to provide a user interface allowing a user to select such a graphical indication using a mouse, touch pad, thumbwheel, or touch screen. The respective interface modules 430, 470 may, for example, be communicatively coupled to respective user interface resources 435, 475, which may comprise any of a number of common user interface resource devices.

In general, a respective output module 425, 465 may output an indication of a processing capability of the second system 450 that is available for use with the first system 410. Accordingly, the scope of various aspects of the present invention should not be limited by characteristics of a particular output signal, process indication, output module, or related methods or apparatus.

One or both of the first 410 and second 450 systems may, for example, comprise respective interface modules 430, 470 that provide for a user to input a request for utilizing an identified processing capability of the second system 450 with the first system 410. Such respective interface modules 430, 470 may, as explained previously, be communicatively coupled to respective user interface resources 435, 475. Alternatively, one or both of the first 410 and second systems 450 may receive a request for utilizing an identified processing capability of the second system 450 with the first system 410 through their respective communication modules 415, 455.

A request for utilizing an identified processing capability of the second system 450 with the first system 410 may, for example, originate from a user utilizing user interface resources 435 communicatively coupled to the interface module 430 of the first system 410, from a user utilizing user interface resources 475 communicatively coupled to the interface module 470 of the second system 450, or from a third system that is communicatively coupled to the first 410 or second 450 systems.

For example, as discussed previously, the respective output modules 425, 465 of the first 410 or second systems 450 may generate a human-perceivable indication of an identified processing capability, and such a human-perceivable indication may also be user-selectable. In such an exemplary scenario, a user may select the output indication (graphical or otherwise), which in turn results in the respective user interface resource 435, 475 generating a signal indicative of the processing capability selection.

The first 410 and second 450 systems may communicate information of such a user selection with each other. For example, if a user of the first system 410 (e.g., through the interface module 430) requests utilization of a particular processing capability of the second system 450 with the first system 410, the first system 410 (e.g., through the communication module 415) may communicate information of the user's request to the second system 450. Alternatively, if a user makes such a request at the second system 450 (e.g., through the interface module 470), the second system 450 (e.g., through the communication module 455) may communicate information of the user's request to the first system 410.

In another exemplary scenario, a user may have configured the user's system to automatically generate such a request. For example, a user of the first system 410 may have configured a module of the first system 410 to automatically generate a request for particular types of identified processing capabilities of the second system 450 upon a determination that such processing capabilities are available. In such a scenario, at least one of the first 410 and second 450 systems may receive a request for utilizing a particular processing capability of the second system 450 with the first system 410, where the request was automatically generated by a module of the first 410 or second 450 system.

In general, a respective interface module 430, 470 of at least one of the first 410 and second 450 systems may provide for a user to directly or indirectly input a request for utilizing an identified processing capability of the second system 450 with the first system 410. Accordingly, the scope of various aspects of the present invention should not be limited by characteristics of a particular request source, request type, request path, request destination or any related method or structure.

One or both of the first 410 and second 450 systems may, for example, comprise respective processing modules 440, 480 that provide for utilizing an identified processing capability of the second system 450 with the first system 410. The respective processing modules 440, 480 may, for example, be communicatively coupled to each other through respective communication modules 415, 455 of the first 410 and second 450 systems.

The respective processing modules 440, 480 may, for example, implement various aspects of the method steps 150 and 310-330 discussed previously and illustrated in FIGS. 1 and 3, but should by no means be limited to implementing such aspects. The respective processing modules 440, 480 may, for example communicate information between the first 410 and second 450 systems. The respective processing modules 440, 480 may, for example, effect such communication using the respective communication modules 415, 455 of the first 410 and second 450 systems.

Such communication may comprise, for example, communicating data from the first system 410 to the second system 450 that is to be processed by the requested processing capability of the second system 450. For example, the data may comprise word processing data, numerical processing data, audio and video data, etc. Such communication may comprise, for example, communicating information from the first system 410 to the second system 450 that is indicative of the location of data to be processed by the requested processing capability of the second system 450. For example, the processing module 440 of the first system 410 may communicate data location information (e.g., pointer or URL information) to the processing module 480 of the second system 450, which the processing module 480 of the second system 450 may then use to obtain data to process with the requested processing capability. For example, in a scenario where the processing module 440 of the first system 410 communicates URL information to the processing module 480 of the second system 450, the processing module 480 of the second system 450 may execute a web browser application to obtain the data to be processed.

Such communication between respective processing modules 440, 480 may comprise, for example, communicating information between the respective processing modules 440, 480 that is used to control the performance of the processing capability of the second system 450. For example, the processing module 440 of the first system 410 may communicate information to the processing module 480 of the second system 450 that triggers or halts execution of the requested processing capability by the processing module 480 of the second system 450 (e.g., start, stop, and other execution control commands). Also, for example, the respective processing modules 440, 480 of the first 410 and second 450 systems may communicate information of the status of the requested processing capability being performed by the processing module 480 of the second system 450.

In general, the respective processing modules 440, 480 may communicate information of various types, where such information generally concerns the processing of information by the processing module 480 of the second system 450. Such information may, for example, comprise data information, data location information, communication information, control information, etc. Accordingly, the scope of various aspects of the present invention should not be limited by characteristics of particular communicated information or particular methods or apparatus associated with such information.

The processing module 480 of the second system 450 may process information using the requested processing capability of the second system 450. For example, the processing module 480 of the second system 450 may process textual information by performing a requested word processing capability, graphical information by performing a requested graphics processing capability, audio information by performing a requested audio processing capability, video information by performing a requested video processing capability, numerical information by performing a requested spreadsheet processing capability, email information by performing a requested email processing capability, etc.

The previous list of processing capabilities is merely exemplary and by no means exhaustive. In general, the processing module 480 of the second system 450 may process information using the requested processing capability of the second system 450. Accordingly, the scope of various aspects of the present invention should not be limited by characteristics of particular processing capabilities of the second system.

The processing module 440 of the first system 410 may also process information. As mentioned previously, the processing module 440 of the first system 410 may process control information that controls execution of the requested processing capability by the processing module 480 of the second system 450. Also, for example, the first system 410 may perform pre-processing and post-processing of data that is processed by the processing module 480 of the second system 450 during performance of the requested processing capability. Accordingly, the scope of various aspects of the present invention should not be limited by whether a particular processing operation is performed by the processing module 440 of the first system 410 or the processing module 480 of the second system 450.

The respective processing modules 440, 480 of the first 410 and second 450 systems may, for example, communicate information resulting from performing the requested processing capability by the processing module 480 of the second system 450. For example, the processing module 480 of the second system 450 may communicate information resulting from the requested processing capability directly to a user in human-perceivable form (e.g., by utilizing the output module 465 of the second system 450 to output indications of the processed information on a video or audio output device).

Alternatively, for example, the processing module 480 of the second system 450 may communicate information resulting from performing the requested processing capability to the first system 410 (e.g., through the respective communication modules 415, 455). The processing module 440 of the first system 410 may then, for example, communicate at least a portion of such information to the user in a human-perceivable form (e.g., by utilizing the output module 425 of the first system 410 to output indications of the processed information on a video or audio output device).

Alternatively, in an exemplary scenario where the processing module 480 of the second system 450 performs the requested processing capability on networked database information, the processing module 480 of the second system 450 may communicate information resulting from the requested processing capability to the networked database for storage.

In general, the respective processing modules 440, 480 may communicate information resulting from the processing module 480 of the second system 450 performing the requested processing capability. The previous examples are merely illustrative. Such communication may occur from a variety of sources, over a variety of media, and to a variety of destinations. Accordingly, the scope of various aspects of the present invention should not be limited by characteristics of particular data communication types, protocols, sources, destinations, etc.

The previous discussion of the system 400 illustrated in FIG. 4 was generally directed to a discussion of various modules of the first 410 and second 450 systems. Such modules may be implemented in hardware, software, or a combination thereof. Additionally, any of the previously discussed modules may be integrated in a single integrated circuit or dispersed in autonomous modules or circuits. Accordingly, the scope of various aspects of the present invention should not be limited by a particular implementation of the modules discussed previously.

Figure 5:
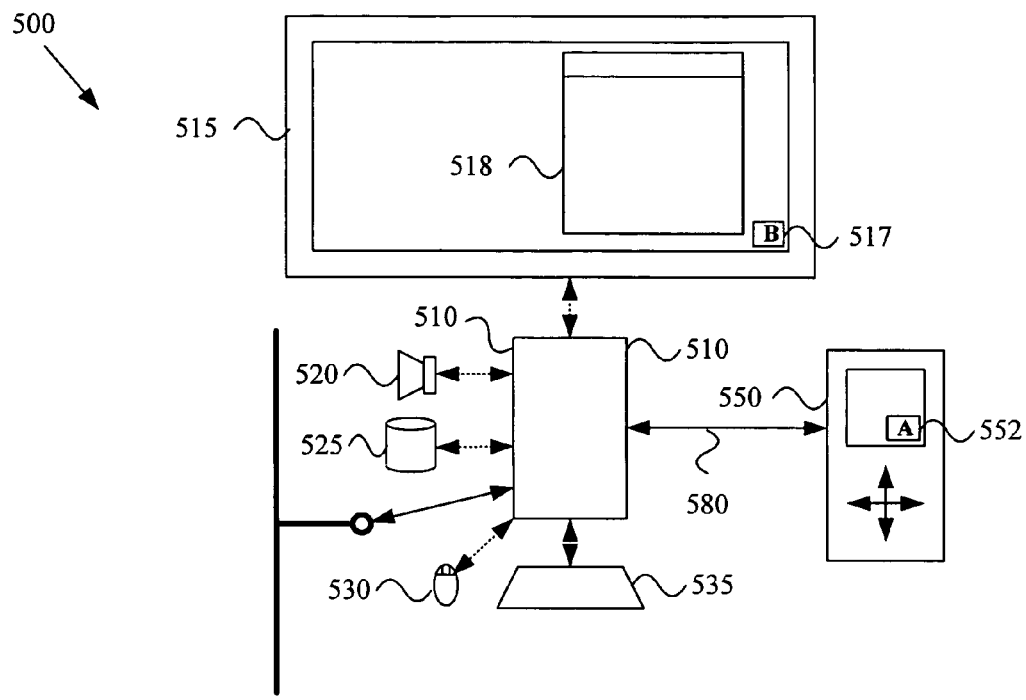
FIG. 5 is a diagram illustrating an exemplary system utilizing processor sharing between a desktop computing system and a PDA in accordance with various aspects of the present invention.

FIG. 5 is a diagram illustrating an exemplary system 500 utilizing processor sharing between a desktop computing system 510 and a PDA 550 in accordance with various aspects of the present invention. The exemplary system 500 comprises a desktop computing system 510, with associated user interface and peripheral devices, including a display 515, speaker 520, hard drive 525, mouse 530, keyboard 535, and network interface 540.

FIG. 5 also illustrates a personal digital assistant (PDA) 550 that is communicatively linked to the desktop computing system 510. In an exemplary wireless network environment, a user may carry the PDA 550 within wireless communication range of the desktop computing system 510. The desktop computing system 510 and the PDA 550 may then, for example, handshake and establish a wireless communication link 580 between them.

Such a wireless communication link 580 may, for example, utilize various communication standards and protocols, including, but not limited to Bluetooth, IEEE 802.11, IEEE 802.15, etc. The desktop computing system 510 and PDA 550 may, for example, include respective communication modules that establish and maintain the wireless communication link 580.

Upon the establishment of the wireless communication link 580 between the systems 510, 550, the systems 510, 550 may, for example, indicate the established communication link 580 to a user in a variety of ways (e.g., utilizing respective output modules). For example, the PDA 550 may produce an audible tone or vibrate. The PDA 550 may, for example, produce an icon on its display indicative of the communication link 580 between the desktop computing system 510 and the PDA 550. The PDA 550 may, for example, produce a window or iconic indication 552 on its display, which corresponds to the desktop computing system 510.

The PDA 550 may, for example, present to a user an indication of each processing capability that the desktop computing system 510 has that is available for use with the PDA 550. The PDA 550 may, for example, present such indications to a user in a flat or nested graphical structure.

The desktop computing system 510 may similarly produce an audible tone or display an icon 517 indicating that the desktop computing system 510 and the PDA 550 are communicatively linked. Alternatively, for example, the desktop computing system 510 may automatically open a dedicated window 518 through which a user at the desktop computing system 510 may access the PDA's 550 resources or utilize the PDA's 550 processing capabilities.

Also, for example, the desktop computing system 510 may generate indications of each particular processing capability of the desktop computing system 510 that is available for use with the PDA 550, and each processing capability of the PDA 550 that is available for use with the desktop computing system 510.

The desktop computing system 510 and PDA 550 may communicate and establish which processing capabilities of each system are available for use with the other system. The desktop computing system 510 and the PDA 550 may each, for example, comprise respective processing capability identification modules to effect such an availability determination.

Upon receiving indications of available processing capabilities, a user may indicate to the system that the user is currently utilizing, which available processing capability of the other system the user desires to utilize. The exemplary desktop computing system 510 and/or the PDA 550 may, for example, comprise respective interface modules that enable a user to provide such input.

Further, for example, the exemplary desktop computing system 510 and/or the PDA 550 may be configured to automatically generate a request for available processing capability upon a determination that such processing capability is available. As an example, the PDA 550 may be configured to automatically request and utilize available network processing capability upon a determination that such network processing capability is available for use with the PDA 550. Also, for example, the PDA 550 may be configured to automatically request and utilize available audio data processing capability upon a determination that such processing capability is available for use with the PDA 550.

A user using the PDA 550 may, for example, select an icon on the PDA 550 display corresponding to the desktop computing system 510 to trigger the PDA 550 to generate a screen or menu on the PDA 550 display corresponding to the desktop computing system 510. The user may then utilize the available resources on the desktop computing system 510 using the I/O capability of the PDA 550.

Alternatively, for example, a user using the PDA 550 may select an icon in the PDA 550 display corresponding to a particular processing capability of the desktop computing system 510 that the user wishes to utilize with the PDA 550. For example, a user using the PDA 550 may directly select an icon representing an audio information processing capability of the desktop computing system 510 that the user wishes to utilize to process audio data residing on the PDA 550 or pointed to by data residing on the PDA 550.

Alternatively, the PDA 550 user may, for example, upon receiving an indication of particular processing capabilities of the desktop computing system 510 being available for use with the PDA 550, physically move to the desktop computing system 510, call up a window on the desktop computing system 510 corresponding to the PDA 510, and request the utilization of one or more of the identified processing capabilities of the desktop computing system 510 with the PDA 550.

Continuing the example, the user may then utilize the enhanced I/O and processing capabilities of the desktop computing system 510 with the PDA 550. The desktop computing system 510 and the PDA 550 may, for example, each have respective processing modules to implement such utilization. For example, the user may utilize the desktop computing system 510 window 518 shown in FIG. 5 to request a text processing capability of the desktop computing system 510 to utilize with text residing on the PDA 550.

The user may, for example, utilize the desktop computing system's 510 processing capability to process email data contained in the PDA 550 or email data pointed to by data contained in the PDA 550. The user may, for example, utilize word recognition processing capability on the desktop computing system 510 to transcribe a text document for a dictation that the user entered into the PDA 550. The user may, for example, utilize enhanced versions of software available on the desktop computing system 510 to operate on information in the PDA 550. The list of potential shared processing capabilities is large.

Further, for example, the desktop computing system 510, as illustrated in FIG. 5, may be communicatively coupled to a communication network (e.g., the Internet) through a network interface 540. A user may, for example, utilize the networking processing capability of the desktop computing system 510 with the PDA 550. For example, a user may update email or retrieve the latest stock quotes by utilizing the desktop computing system's 550 networking processing capability. As mentioned early, such processing capability identification, requesting and utilization may occur automatically.

Similarly, for example, if security allows it, the user of the PDA 550 may utilize communication processing capability and information access capability of the desktop computing system 510 to access data stored on the desktop computing system 510, or utilizing the desktop computing system's 510 link to a local area network database or document management system.

Figure 6:
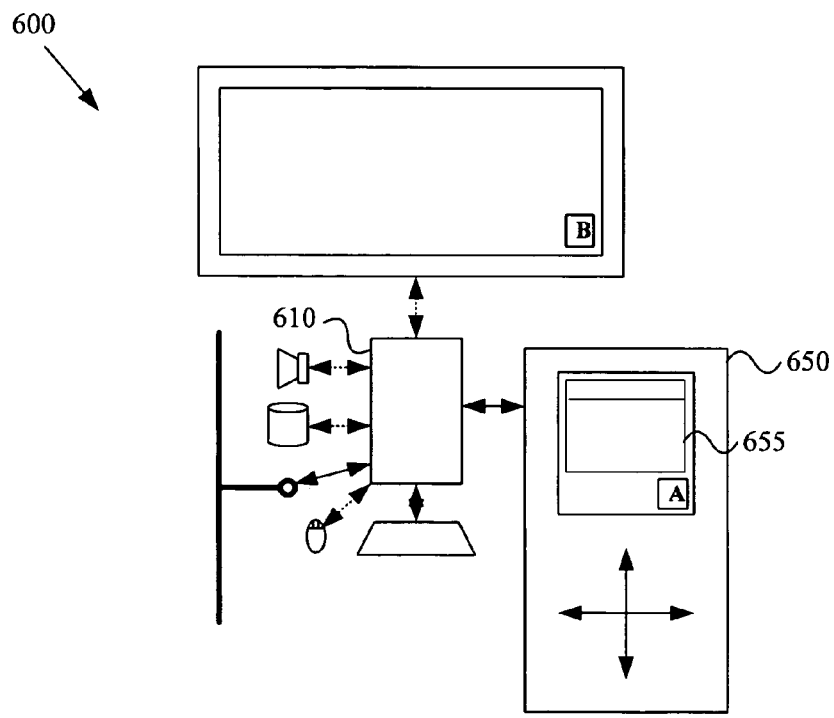
FIG. 6 is a diagram illustrating an exemplary system utilizing processor sharing between a desktop computing system and a PDA in accordance with various aspects of the present invention.

FIG. 6 is a diagram illustrating an exemplary system 600 utilizing processor sharing between a desktop computing system 610 and a PDA 650 in accordance with various aspects of the present invention. FIG. 6 illustrates a general scenario where the user of the PDA 650 is utilizing the user interface capability of the PDA 650 to utilize at least a portion of the desktop computing system 610 processing capabilities with the PDA 650.

The exemplary PDA 650 includes a window 655 dedicated to communicating with the desktop computing system 610. For example, the PDA 650 could be sending raw data to the desktop computing system 610 for processing, which the desktop computing system 610 then returns to the PDA 650 after processing. Information received from the desktop computing system 610 could, for example, be completely driving the window 655 of the PDA 650, allowing a user of the PDA 650 to utilize, for example, word processing capability of the desktop computing system 610 that the PDA 650 does not have compatible software for.

Figure 7:
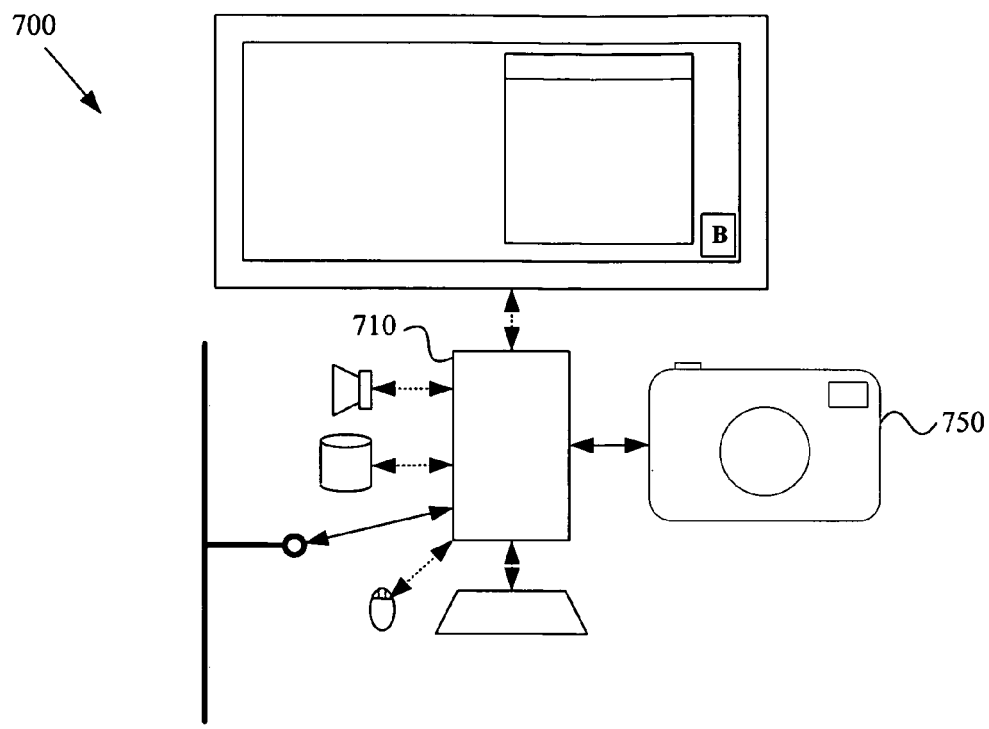
FIG. 7 is a diagram illustrating an exemplary system utilizing processor sharing between a desktop computing system and a digital camera in accordance with various aspects of the present invention.

FIG. 7 is a diagram illustrating an exemplary system 700 utilizing processor sharing between a desktop computing system 710 and a digital camera 750 in accordance with various aspects of the present invention. A user may, for example, bring a digital camera 650 within range of the desktop computing system 710. The user may then utilize processing capabilities of the desktop computing system 710 with the digital camera 750.

For example, the user may select an icon on the desktop computing system's 710 display corresponding to the in-range digital camera 750, which may open a window on the desktop computing system's 710 display corresponding to the digital camera 750. The user may then utilize image-processing applications on the desktop computing system 710 to operate on the picture information contained in the digital camera 750.

For another example, the user of the digital camera 750 may utilize the user interface of the digital camera 750 to control utilization of the desktop computing system's 710 processing capability with the digital camera 750. Such processing capability may include, for example, image-processing capability (e.g., image manipulation and transferring operations). This activity may occur, for example, while another user is utilizing the desktop computing system 710.

As further examples, the user of the digital camera 750 may, for example, access the hard drive of the desktop computing system 710 to view picture information stored on the desktop computing system 710. The user of the digital camera 750 may, for example, access the network connection of the desktop computing system 710 and thereby send and receive picture information over the Internet.

Figure 8:
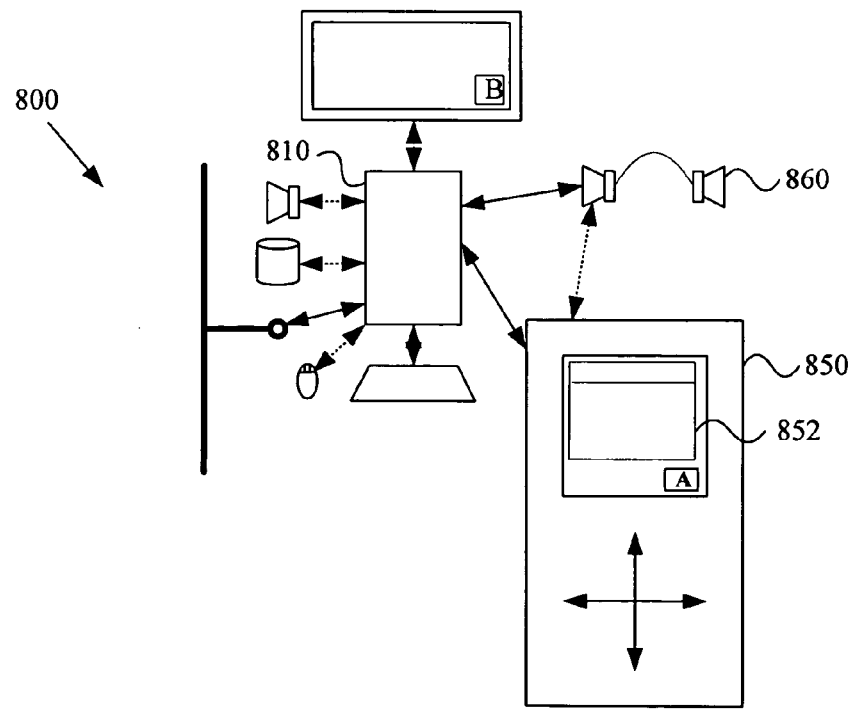
FIG. 8 is a diagram illustrating an exemplary system utilizing processor sharing between a desktop computing system and a PDA in accordance with various aspects of the present invention.

FIG. 8 is a diagram illustrating an exemplary system 800 utilizing processor sharing between a desktop computing system 810 and a PDA 850 in accordance with various aspects of the present invention. A user may, for example, be utilizing the PDA 850 to drive a headset 860 with music information from the PDA 850 when the user comes within wireless range of the desktop computing system 810. The PDA 850 user may then access music processing capability of the desktop computing system 810 to provide music to the headset 860. The PDA 850 user may, for example, open a window 852 on the PDA 850 display and access the music processing and/or database interface capabilities of the desktop computing system 810. The PDA 850 user may also utilize audio transmission capabilities of the desktop computing system 810 to transmit the music information to the headset 860, potentially resulting in enhanced music quality for the user and conserving energy resources for the PDA 850.

Note that the systems 500, 600, 700 and 800 shown in FIGS. 5-8 are merely exemplary. As such, the scope of various aspects of the present invention should by no means be limited by characteristics of the particular examples illustrated in FIGS. 5-8. For example, various examples illustrate exemplary processor sharing between a desktop computing system and a personal digital assistant. Such exemplary system configurations were chosen for convenience and should by no means limit the scope of various aspects of the present invention to characteristics of desktop computing systems and personal digital assistants.

In summary, aspects of the present invention provide a system and method for sharing processing resources between in-range devices. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. In a first system, a method for utilizing processing of a second system by the first system, the method comprising:
   initiating, by the first system, establishment of a wireless communication link with the second system;
   identifying, by the first system, a processing capability of the second system that is available for use by the first system, wherein said identifying takes place prior to any utilization of said identified processing capability by the first system, and said identifying comprises:
      receiving information from the second system regarding computer applications that the second system is capable of executing; and
      identifying a computer application on the second system that is capable of being utilized by the first system, where a reduced-capability version of the identified computer application resides on the first system;
   communicating, by the first system, to the second system, a request for utilizing the identified processing capability; and
   utilizing, by the first system, the requested processing capability.

2. The method of claim 1, wherein the identified computer application is a word-processing application.

3. The method of claim 1, wherein the identifying of the processing capability comprises:
   receiving, by the first system, security information from the second system, the security information comprising information related to one or both of how data from the first system is stored by the second system and how data from the first system is deleted by the second system; and
   determining, based at least in part on the security information, whether the processing capability is available for use with the first system.

4. The method of claim 1, wherein the identifying of the processing capability comprises:
   communicating information of communication capability with the second system; and
   determining, based at least in part on the information of communication capability, whether the processing capability is available for use by the first system.

5. The method of claim 1, comprising outputting an indication of the identified processing capability, wherein the outputting comprises outputting a human-perceivable indication of the identified processing capability.

6. The method of claim 1, wherein the communicating of the request for utilizing the identified processing capability with the first system comprises communicating the request from a user of the first system.

7. The method of claim 1, wherein the utilizing of the requested processing capability by the first system comprises the first system controlling execution of the requested processing capability on the second system.

8. The method of claim 1, wherein the utilizing of the requested processing capability by the first system comprises communicating to the second system one or both of:
   data to be processed by the requested processing capability; and
   information of the location of data to be processed by the requested processing capability.

9. The method of claim 1, further comprising receiving, by the first system, instructions from the second system regarding remedying a compatibility issue between the first system and the second system.

10. The method of claim 1, further comprising, prior to said identifying, receiving configuration information from a user related to automatic generation of said request upon determination that the particular processing capability is available for use with the first system.

11. The method of claim 1, further comprising, prior to said utilizing, interacting wirelessly directly with a third system to perform a function, and wherein utilizing the requested processing capability with the first system comprises utilizing the second system to interact wirelessly directly with the third system to perform the function.

12. The method of claim 11, wherein the third system comprises a wireless-capable audio device, and the function comprises utilizing the third system to output music.

13. The method according to claim 1, wherein said identifying comprises outputting an indication of the identified processing capability.

14. The method according to claim 1, wherein said identifying of said processing capability is based at least in part on a level of encryption/decryption capability available at the second system.

15. A portable wireless device that operates to utilize processing of a second system by the portable wireless device, the portable wireless device comprising:
   at least one module comprising hardware, said at least one module operating to, at least perform:
      initiating, by the portable wireless device, establishment of a wireless communication link with the second system;

receiving information from the second system regarding computer applications that the second system is capable of executing;

identifying, by the portable wireless device, a processing capability of the second system that is available for use by the portable wireless device by, at least in part, identifying a computer application on the second system that is capable of being utilized by the portable wireless device, wherein a reduced-capability version of the identified computer application resides on the portable wireless device, and wherein said identifying takes place prior to any utilization of said identified processing capability by the portable wireless device;

communicating, by the portable wireless device, to the second system, a request for utilizing the identified processing capability; and utilizing, by the portable wireless device, the requested processing capability.

16. The portable wireless device of claim 15, wherein the identified computer application is a word-processing application.

17. The portable wireless device of claim 15, wherein the at least one module operates to:

communicate security information with the second system, the security information comprising information related to one or both of how data from the portable wireless device is stored by the second system and how data from the portable wireless device is deleted by the second system; and determine, based at least in part on the security information, whether the processing capability is available for use with the portable wireless device.

18. The portable wireless device of claim 15, wherein the at least one module operates to:

communicate information of communication capability with the second system; and determine, based at least in part on the information of communication capability, whether the processing capability is available for use with the portable wireless device.

19. The portable wireless device of claim 15, wherein the at least one module operates to output a human-perceivable indication of the identified processing capability.

20. The portable wireless device of claim 15, wherein the at least one module operates to receive a request from a user of the portable wireless device for utilizing the identified processing capability of the second system with the portable wireless device.

21. The portable wireless device of claim 15, wherein the at least one module operates to utilize the requested processing capability by, at least in part, controlling the performance of the requested processing capability on the second system.

22. The portable wireless device of claim 15, wherein the at least one module operates to utilize the processing capability by, at least in part, communicating to the second system one or both of:

data to be processed by the requested processing capability; and information of the location of data to be processed by the requested processing capability.

23. The portable wireless device of claim 15, wherein the at least one module is integrated into a single integrated circuit.

24. The portable wireless device of claim 15, wherein the at least one module further operates to receive instructions from the second system regarding remedying a compatibility issue between the portable wireless device and the second system.

25. The portable wireless device of claim 15, wherein the at least one module further operates to, prior to said operating to identify, receive configuration information from a user related to automatic generation of said request upon determination that the particular processing capability is available for use with the portable wireless device.

26. The portable wireless device of claim 15, wherein the at least one module further operates to, prior to said operating to utilize, interact wirelessly directly with a third system to perform a function, and wherein the at least one module operates to utilize the requested processing capability with the portable wireless device by, at least in part, operating to utilize the second system to interact wirelessly directly with the third system to perform the function.

27. The portable wireless device of claim 26, wherein the third system comprises a wireless-capable audio device, and the function comprises utilizing the third system to output music.

28. The portable wireless device of claim 15, wherein the at least one module operates to:

communicate security information with the second system, the security information comprising information related to encryption/decryption capabilities of the second system; and refuse, based at least in part on the security information, to use the processing capabilities of the second system in response to determining that the encryption/decryption capabilities of the second system are below a particular level.

29. The portable wireless device of claim 15, wherein the at least one module operates to:

communicate security information with the second system, the security information comprising information related to storing data of the portable wireless device in non volatile memory of the second system; and refuse, based at least in part on the security information, to use the processing capabilities of the second system in response to determining that the second system would store data of the portable wireless device in non volatile memory of the second system.

30. The portable wireless device of claim 15, wherein the at least one module operates to:

communicate security information with the second system, the security information comprising information related to purging data of the portable wireless device after use of the processing capabilities of the second system; and refuse, based at least in part on the security information, to use the processing capabilities of the second system in response to determining that the second system does not purge data of the portable device after use of the processing capabilities of the second system.

31. The portable wireless device of claim 15, wherein the at least one module operates to:

communicate security information with the second system, the security information comprising information related to locking out other users while the portable wireless device uses the processing capabilities of the second system; and refuse, based at least in part on the security information, to use the processing capabilities of the second system in response to determining that the second system does sufficiently lock out other users while using the processing capabilities of the second system.

32. In a second system, a method for utilizing processing of the second system by a first system, the method comprising:

initiating, by the second system, establishment of a wireless communication link with the first system;

identifying, by the second system, a processing capability of the second system that is available for use by the first system, wherein said identifying takes place prior to any utilization of said identified processing capability by the first system, and wherein said identifying comprises:
  sending information, by the second system, to the first system regarding computer applications that the second systems is capable of executing; and
  identifying a computer application on the second system that is capable of being utilized by the first system, where a reduced-capability version of the identified computer application resides on the first system; and
  receiving, by the second system, from the first system, a request for utilizing the identified processing capability by the first system.

33. The method of claim 32, wherein the identified computer application is a word-processing application.

34. The method of claim 32, wherein the identifying of the processing capability comprises:
  sending, by the second system, security information to the first system, the security information comprising information related to one or both of how data from the first system is stored by the second system and how data from the first system is deleted by the second system; and
  determining, based at least in part on the security information, whether the processing capability is available for use with the first system.

35. The method of claim 32, wherein the identifying of the processing capability comprises:
  sending, by the second system, information of communication capability to the first system; and
  determining, by the second system, based at least in part on the information of communication capability, whether the processing capability is available for use by the first system.

36. The method of claim 32, comprising outputting, by the second system, an indication of the identified processing capability, wherein the outputting comprises outputting a signal to the first system indicative of the identified processing capability.

37. The method of claim 32, wherein the receiving of the request for utilizing the identified processing capability by the first system comprises the second system receiving a signal indicative of the request from the first system.

38. The method of claim 32, comprising utilizing the requested processing capability by the first system, wherein the utilizing comprises receiving, by the second system from the first system, at least one or both of:
  data to be processed using the requested processing capability; and
  information of the location of data to be processed using the requested processing capability.

39. A computer system that provides processing for utilization with a portable wireless device, the computer system comprising:
  at least one module comprising hardware, said at least one module operating to, at least perform:
    initiating, by the computer system, establishment of a wireless communication link with the portable wireless device;
    sending information, by the computer system, to the portable wireless device regarding computer applications that the computer system is capable of executing;
    identifying, by the computer system, a processing capability of the computer system that is available for use with the portable wireless device by, at least in part,
      identifying a computer application on the computer system that is capable of being utilized by the portable wireless device, wherein a reduced-capability version of the identified computer application resides on the portable wireless device, and wherein the identifying takes place prior to any utilization of the identified processing capability by the portable wireless device;
    receiving, by the computer system, from the portable wireless device, a request for utilizing the identified processing capability of the computer system with the portable wireless device; and
    performing, by the computer system, the requested processing capability.

40. The computer system of claim 39, wherein the identified computer application is a word-processing application.

41. The computer system of claim 39, wherein the at least one module operates to:
  communicate security information with the portable wireless device, the security information comprising information related to one or both of how data from the portable wireless device is stored by the computer system, and how data from the portable wireless device is deleted by the computer system; and
  determine by the computer system, based at least in part on the security information, whether the processing capability is available for use by the portable wireless device.

42. The computer system of claim 39, wherein the at least one module operates to:
  communicate information of communication capability of the computer system with the portable wireless device; and
  determine, based at least in part on the information of communication capability, whether the processing capability is available for use by the portable wireless device.

43. The computer system of claim 39, wherein the at least one module operates to output a signal indicative of the identified processing capability to the portable wireless device.

44. The computer system of claim 39, wherein the at least one module operates to receive a signal from the portable wireless device, the signal indicative of the request for utilizing the identified processing capability by the portable wireless device.

45. The computer system of claim 39, wherein the at least one module operates to receive, from the portable wireless device, one or both of:
  data to be processed using the requested processing capability; and
  information of the location of data to be processed using the requested processing capability.

46. The computer system of claim 39, wherein the at least one module is integrated in a single integrated circuit.

47. A method for utilizing processing of a second system by a first system, the method comprising:
  initiating, by the first system, establishment of a wireless communication link between the first system and the second system;
  identifying, by the first system, a processing capability of the second system that is available for use by the first system, wherein said identifying takes place prior to any utilization of said identified processing capability by the first system, and said identifying comprises:
    receiving information from the second system regarding computer applications that the second system is capable of executing; and
    identifying a computer application on the second system that is capable of being utilized by the first system, where a reduced-capability version of the identified computer application resides on the first system;

communicating, by the first system, to the second system, a request for utilizing the identified processing capability; and utilizing, by the first system, the requested processing capability.

48. The method of claim 47, wherein the identified computer application is a word-processing application.

49. The method of claim 47, wherein the identifying of the processing capability comprises:

communicating security information between the first and second systems, the security information comprising information related to one or both of how data from the first system is stored by the second system and how data from the first system is deleted by the second system; and determining, based at least in part on the security information, whether the processing capability is available for use with the first system.

* * * * *